(12) United States Patent
Finlow-Bates

(10) Patent No.: US 10,938,566 B2
(45) Date of Patent: Mar. 2, 2021

(54) BLOCKCHAIN BASED IDENTITY AND ACCESS MANAGEMENT

(71) Applicant: Keir Finlow-Bates, Kangasala (FI)

(72) Inventor: Keir Finlow-Bates, Kangasala (FI)

( * ) Notice: Subject to any disclaimer, the term of this patent is extended or adjusted under 35 U.S.C. 154(b) by 300 days.

(21) Appl. No.: 16/057,877

(22) Filed: Aug. 8, 2018

(65) Prior Publication Data

US 2020/0052899 A1 Feb. 13, 2020

(51) Int. Cl.
*H04L 9/32* (2006.01)
*H04L 9/06* (2006.01)
*H04L 9/08* (2006.01)

(52) U.S. Cl.
CPC .......... *H04L 9/3228* (2013.01); *H04L 9/0643* (2013.01); *H04L 9/0656* (2013.01); *H04L 9/0863* (2013.01); *H04L 9/3271* (2013.01); *H04L 2209/38* (2013.01)

(58) Field of Classification Search
CPC ... H04L 9/3228; H04L 9/0656; H04L 9/0643; H04L 9/0863; H04L 9/3271; H04L 9/3239; H04L 2209/38; H04L 2209/56; H04L 63/0838
See application file for complete search history.

(56) References Cited

U.S. PATENT DOCUMENTS

| | | | |
|---|---|---|---|
| 8,826,407 B2 | 9/2014 | Henderson | |
| 9,569,771 B2 | 2/2017 | Lesavich | |
| 10,630,667 B2 | 4/2020 | Zhang | |
| 2014/0032937 A1 | 1/2014 | Sadler | |
| 2018/0150621 A1* | 5/2018 | Lukas | G06F 21/46 |
| 2019/0163896 A1* | 5/2019 | Balaraman | H04L 9/3226 |
| 2019/0303561 A1* | 10/2019 | Humble | H04L 9/0869 |
| 2019/0332691 A1* | 10/2019 | Beadles | G06Q 20/065 |

* cited by examiner

*Primary Examiner* — Nelson S. Giddins

(57) ABSTRACT

Identity and access management in computer systems without the need for a central authority is provided. A user may create an identity on a blockchain, and generate a one-time pad of access passwords derived from repeated hashing of a master password and cryptographic salt. The user may publish a last access password from the one-time pad on the blockchain. The user may then provide proof of identify in response to an access challenge by revealing a prior access password from which the last access password is derived, and may receive a session token in response. The publishing of access passwords and receiving of session tokens may be associated with a transfer of tokens or digital credits of commercial value on the blockchain.

21 Claims, 11 Drawing Sheets

1100 Smart contract

1102 Procedure: publish user identifier on blockchain

1104 Procedure: retrieve most recent published password

1106 Procedure: publish used password on blockchain

1108 Procedure: generate new one-time password pad

1110 Procedure: generate salt

1112 Procedure: revoke user identifier

1114 Procedure: offer token payment

1116 Procedure: redeem token payment

FIG. 11

BLOCKCHAIN BASED IDENTITY AND ACCESS MANAGEMENT

TECHNICAL FIELD

This disclosure relates to computer systems and methods concerned with identity and access management (IAM), and more specifically to systems and methods for distributed and decentralized identity and access management using a blockchain.

BACKGROUND

Distributed ledgers or blockchains provided in, for example, a peer-to-peer network, such as the distributed ledger used in the Bitcoin cryptocurrency system, allow participants on the peer-to-peer network to participate in a sharing of information in a distributed manner without a need for a central authority. Identity and access management concerns an effective and permissioned distribution of data among identified participants.

A current solution for identity and access management systems comprises controls and methods to capture and record user login information, and manage an assignment and removal of access privileges, through a use of a centralized directory service managed by a central authority.

However, centralized IAM systems have a number of problems. The central authority may have an ability to arbitrarily issue and revoke access privileges without oversight. Furthermore, central authorities are able to set their own pricing for their services, ofttimes resulting in higher costs for users of the centralized system.

It is therefore an intention of the present disclosure to address the problem of identity and access management for resources in a cost-efficient decentralized fashion without recourse to a central authority.

SUMMARY

In accordance with the present disclosure, a solution is provided for enabling identity and access management for computer systems, data and resources through a medium of a blockchain.

An example embodiment may include a method for providing identity and access management, comprising: generating a one-time password pad derived from a master password and a salt, said one-time password pad comprising a plurality of passwords; publishing a last password from the one-time password pad and a user identifier on a blockchain; on receiving an access challenge, presenting the user identifier and a prior password from the one-time password pad; and publishing a message comprising the prior password on the blockchain.

In the example embodiment, the access challenge may comprise an offering of a token and the message may comprise a claim of the token.

In other embodiments, the message may comprise an offering of the token, and publishing the message on the blockchain may comprise a claim of the token.

In the example embodiment, the method may further comprise accepting the prior password in response to the access challenge if the prior password is not published on the blockchain at the time the prior password is presented, and the last password is derived from the prior password.

In the example embodiment, each one of the plurality of passwords in the one-time password pad may be generated by applying a cryptographic hash function to a concatenation of the master password and the salt a different number of times.

In the example embodiment, the salt may be derived from a prior data in the blockchain.

In a further enhancement of the example embodiment, a new one-time password pad may be generated using a new master password and a new salt, said new one-time password pad comprising a new plurality of passwords; and the master password, a new last password from the new one-time password pad, and the user identifier may be published on the blockchain. In some embodiments a prior unused password may be published in place of the master password.

In the further enhancement of the example embodiment, subsequently any one of the plurality of passwords may be rejected as response to a new access challenge.

In the example embodiment, the token may be transferred using a smart contract on the blockchain.

An other example embodiment may include a first apparatus and a second apparatus providing identity and access management, wherein the first apparatus comprises a first processor configured to issue an access challenge to the apparatus, and the second apparatus comprises a second processor configured to: generate a one-time password pad derived from a master password and a salt, said one-time password pad comprising a plurality of passwords; publish a last password from the one-time password pad and a user identifier on a blockchain; on receiving the access challenge, present a prior password from the one-time password pad to the first apparatus; and publish a message comprising the prior password on the blockchain.

In the other example embodiment, the access challenge may comprise an offering of a token and the message may comprise a claim of the token.

In the other example embodiment, the first processor may be further configured to accept the prior password presented by the second apparatus in response to the access challenge if the prior password is not published on the blockchain at the time the prior password is presented, and the last password is derived from the prior password.

In the other example embodiment the second processor may be further configured to generate each one of the plurality of passwords by applying a cryptographic hash function to a concatenation of the master password and the salt a different number of times.

In the other example embodiment the second processor may be further configured to derive the salt from a prior data in the blockchain.

In an alternate embodiment of the other example embodiment the second processor may be further configured to: generate a new one-time password pad using a new master password and a new salt, said new one-time password pad comprising a new plurality of passwords; and publish the master password, a new last password from the new one-time password pad, and the user identifier, on the blockchain. In some embodiments a prior unused password may be published in place of the master password.

In the alternate embodiment of the other example embodiment the first processor may be further configured to subsequently reject any one of the plurality of passwords.

In the other example embodiment the token may be transferred using a smart contract on the blockchain.

A yet other example embodiment may comprise a first non-transitory computer readable medium embodying first instructions and a second non-transitory computer readable medium embodying second instructions, for providing identity and access management, the first instructions when executed causing a first processor to issue an access challenge to a second processor, and the second instructions when executed causing a second processor to: generate a one-time password pad derived from a master password and a salt, said one-time password pad comprising a plurality of passwords; publish a last password from the one-time password pad and a user identifier on a blockchain; on receiving the access challenge, present a prior password from the one-time password pad; and publish a message comprising the prior password on the blockchain.

In the yet other embodiment the access challenge may comprise an offering of a token and the message may further comprise a claim of the token.

In the yet other embodiment the first instructions may further cause the first processor to accept the prior password presented by the second processor in response to the access challenge if the prior password is not published on the blockchain at the time the prior password is presented, and the last password is derived from the prior password.

In the yet other embodiment the second instructions may further cause the second processor to generate each one of the plurality of passwords by applying a cryptographic hash function to a concatenation of the master password and the salt a different number of times.

In the yet other embodiment the second instructions may further cause the second processor to derive the salt from a prior data in the blockchain.

In an other alternate embodiment of the yet other embodiment the second instructions may further cause the second processor to: generate a new one-time password pad using a new master password and a new salt, said new one-time password pad comprising a new plurality of passwords; and publish the master password, a new last password from the new one-time password pad, and the user identifier, on the blockchain. In some embodiments a prior unused password may be published in place of the master password.

In the other alternate embodiment of the yet other embodiment the first instructions may further cause the first processor to subsequently reject any one of the plurality of passwords.

In the yet other embodiment the token may be transferred using a smart contract on the blockchain.

In some embodiments of the present disclosure, the token may comprise a plurality of tokens. In other embodiments the token may comprise a digital credit of commercial value, a cryptocurrency such as Bitcoin, a utility token such as Ether, or an other unique unforgeable digital asset tracked and transferred using a distributed ledger or blockchain.

In some embodiments of the present disclosure, tokens may be instantiated and transferred using a smart contract. A smart contract may comprise computer code submitted to a blockchain, and run on one or more blockchain nodes in response to a submission of a token transaction to the blockchain.

In some embodiments of the present disclosure, the salt may comprise a random number. In other embodiments the salt may comprise an arbitrary number, used only once per one-time password pad, to be used as protection from cryptographic attacks using rainbow tables.

In some embodiments of the present disclosure, the salt may be derived from data published in the blockchain, for example but not limited to a most recent block published on the blockchain at a time the one-time password pad is generated. The salt may be derived by applying a one-way function, for example a cryptographic hash function, to some or all of data included in the most recent block.

Those skilled in the art will further appreciate the advantages and superior features found in this disclosure together with other important aspects thereof on reading the detailed description that follows in conjunction with the DRAWINGS.

BRIEF DESCRIPTION OF THE DRAWINGS

The components in the figures are not necessarily to scale, emphasis instead being placed upon illustrating the principles of the present disclosure. In the figures, like reference numerals designate corresponding parts throughout the different views.

FIG. 11 is a programmatic diagram illustrating a structure of a smart contract providing functions and methods related to identity and access management and associated payment transactions, in one embodiment of the present disclosure.

DETAILED DESCRIPTION

Various aspects of this disclosure are now described with reference to the drawings. In a description that follows, specific details are provided to promote a thorough understanding of one or more aspects of the disclosure.

The present disclosure is directed to a method, apparatus, and system for managing identity and access to computer systems and services, and for offering and redeeming tokens through token transactions associated with identity and access management, in a decentralized system through a use of a blockchain and a one-time password pad.

Identity management may comprise a reliable determination that a user of a system is who the user claims to be. For traditional centralized systems identity management may be achieved by supplying the user with a user identifier (UID) and an associated password, for example through a login system.

Access management may comprise allocating system resources or allowing access to system data to a user, said user being identified through a successful login to the login system. For traditional centralized systems an access permission to system resources or system data may be recorded in a centralized directory, linking the user to the access permission via the user identifier.

Token transactions may comprise one or more of: an offering of tokens that may be redeemed under specified conditions, a redemption of offered tokens, a generation of new tokens, and a destruction of tokens.

A token may comprise one or more of: a cryptocurrency, a cryptocoin, a digital loyalty point, a digital credit, and a unique unforgeable digital asset. A token may be associated with a clear and unique ownership, and an ability to transfer said token from one entity to another entity through a distributed ledger such as a blockchain.

Figure 1:
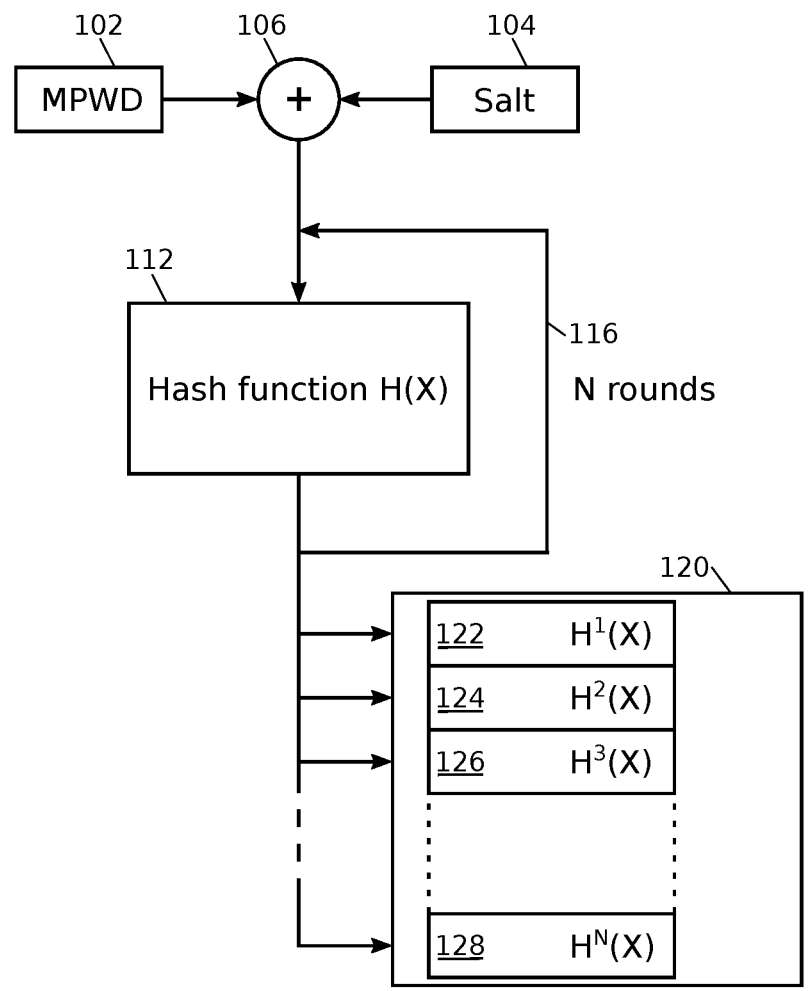
FIG. 1 is a diagram illustrating a generation of a one-time password pad.

In FIG. 1, a diagram illustrating a process for generating a one-time password pad, in an embodiment of the present disclosure, is presented.

In the embodiment, a user may provide a master password 102 (MPWD). The master password 102 may be concatenated with a salt 104, using a concatenation function 106, to produce a concatenation.

The concatenation may be passed to a hash function 112, producing a first hash output 122, which may be stored in a table 120. The first hash output 122 may also be passed back into the hash function 112 to produce a second hash output 124, which may also be stored in the table 120. This process may be repeated a total of N rounds, as shown by 116, producing further hash outputs, namely a third hash output 126 up to a last hash output 128, which may also be stored in the table 120. In the present disclosure hash outputs may be referred to as passwords, for example the last hash output 128 may also be referred to as a last password.

Those skilled in the art will appreciate that each password may be derived from a prior password by applying the hash function 112 to the prior password, with an exception of a first password, which is derived by applying the hash function 112 to the concatenation.

Those skilled in the art will also appreciate that the table 120 of passwords may be used as a one-time password pad.

Provided the hash function 112 is a suitable one-way function, the one-time password pad may only be produced with knowledge of the master password and the salt. In some embodiments, the hash function 112 may comprise a cryptographic hash algorithm, for example: SHA, RIPEMD, Whirlpool, Scrypt, HAS-160, BLAKE, or other cryptographic hash function. In other embodiments the hash function 112 may comprise a block cipher, a stream cipher, or an application of a plurality of hash functions.

The table 120 of passwords may be used as a one-time password pad by, for example, initially revealing the last password along with a user identifier, and subsequently revealing a prior password as a response to an identity challenge.

In some embodiments, the last password and the user identifier may be initially revealed on a blockchain.

Figure 2:
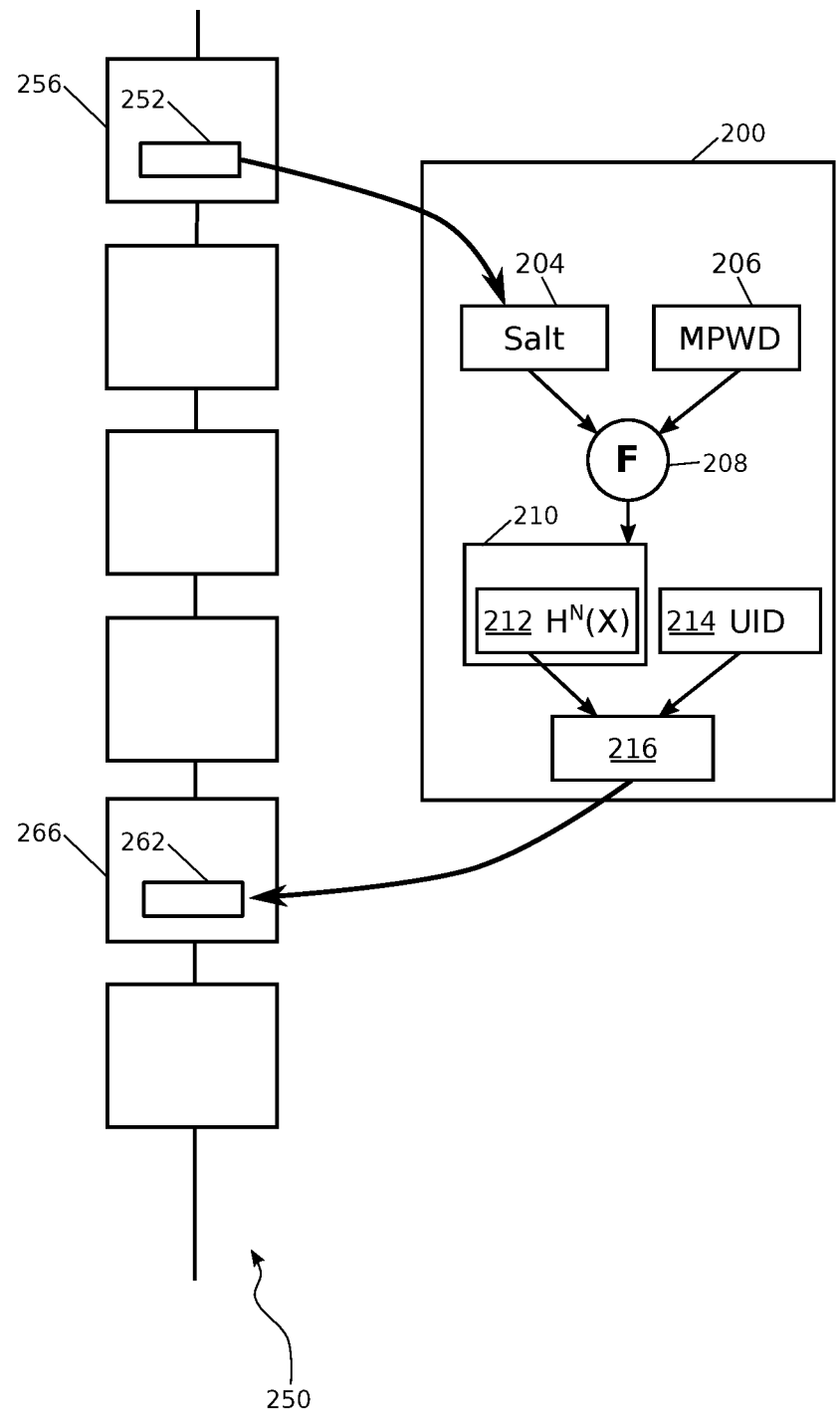
FIG. 2 illustrates an apparatus configured to generate a one-time password pad and publish a last password from the one-time password pad on a blockchain, in one embodiment of the present disclosure.

In FIG. 2 a possible embodiment of an apparatus 200 configured to generate a one-time password pad 210 and publish a last password 212 from the one-time password pad on a blockchain is illustrated.

The apparatus 200 may retrieve data 252 from a block 256 stored in a blockchain 250. In some embodiments, the block 256 may comprise a head block of the blockchain 250 at a time the apparatus commences generating the one-time password pad.

The apparatus 200 may utilize the data 252 to generate a salt 204. In some embodiments the salt 204 may comprise the data 252. In other embodiments the salt 204 may comprise a hash output resulting from applying a hash function to the data 252.

In some embodiments, the apparatus 200 may generate a master password 206, for example through a use of a random number generator. In other embodiments, the apparatus 200 may receive the master password 206 from a user.

In the possible embodiment, the apparatus 200 may apply a process 208 to the salt 204 and the master password 206 to produce the one-time password pad 210. In some embodiments the process 208 may comprise the process for generating a one-time password pad disclosed by FIG. 1.

In some embodiments, the apparatus 200 may generate a user identifier 214, for example through a use of a random number generator or a dictionary. In other embodiments, the apparatus 200 may receive the user identifier 214 from the user.

In some embodiments, the apparatus 200 may construct a message 216 comprising a last password 212 from the one-time password pad 210 and the user identifier 214. In further embodiments, the message 216 may further comprise a reference or pointer to the block 256 comprising the data 252 from which the salt 204 was generated. In other further embodiments, the message 216 may further comprise the salt 204.

In some embodiments, the apparatus 200 may transmit the message 216 to the blockchain 250, and the message 216 may be included in a block 266 as block data 262.

Figure 3:
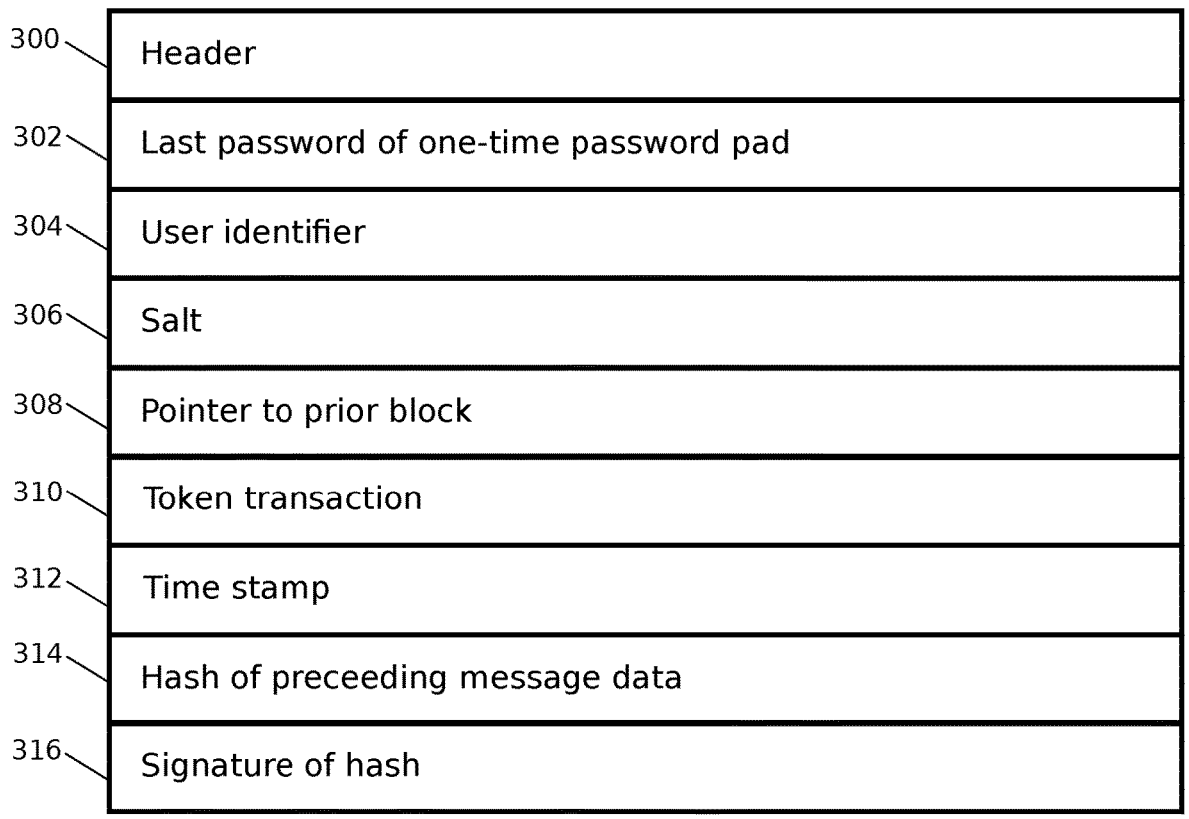
FIG. 3 is a diagram illustrating a data structure of a message published on the blockchain, in one embodiment of the present disclosure.

FIG. 3 illustrates an embodiment of a structure for a message announcing a user on a blockchain.

In some embodiments, the message may comprise a header 300, which in some embodiments may comprise: an identifier indicating that the message comprises the message announcing the user, a size of the message, a protocol for the message, and a structure of data included in the message.

In some embodiments, the message may comprise a last password 302 from a one-time password pad.

In some embodiments, the message may comprise a user identifier 304.

In some embodiments, the message may comprise a salt 306. In some embodiments the salt 306 may be derived from data extracted from a prior block in the blockchain.

In some embodiments, the message may comprise a pointer 308 to the prior block. In some embodiments the pointer 308 may comprise a sequence number of the prior block, known to those skilled in the art as a block height. In other embodiments the pointer 308 may comprise at least one of: a time stamp of the prior block, a byte offset within a digital representation of the blockchain, and a hash of the prior block.

The message may comprise a token transaction 310. The token transaction 310 may comprise a script, said script providing validation for the token transaction. In some embodiments the token transaction 310 may comprise an offer of digital credits.

The message may comprise a time stamp 312. In an embodiment the time stamp 312 may comprise a time at which the message was constructed. In some embodiments the message may comprise a plurality of time stamps.

The message may comprise a hash 314 of all or part of a preceding message contents. The hash 314 may be calculated using a cryptographic hash algorithm, for example:

SHA, RIPEMD, Whirlpool, Scrypt, HAS-160, BLAKE, or other cryptographic hash function applied to all or part of the preceding content of the preceding message contents, where a hash output cannot be determined from a hash input other than by an application of the cryptographic hash function to the hash input.

The message may also comprise a digital signature 316, generated with a digital signature algorithm using a private key associated with the user identifier 304, in order to provide for the veracity of the message. The digital signature algorithm used may be one of ECDSA, DSA, RSA, or some other secure asymmetric key digital signing algorithm.

Figure 4:
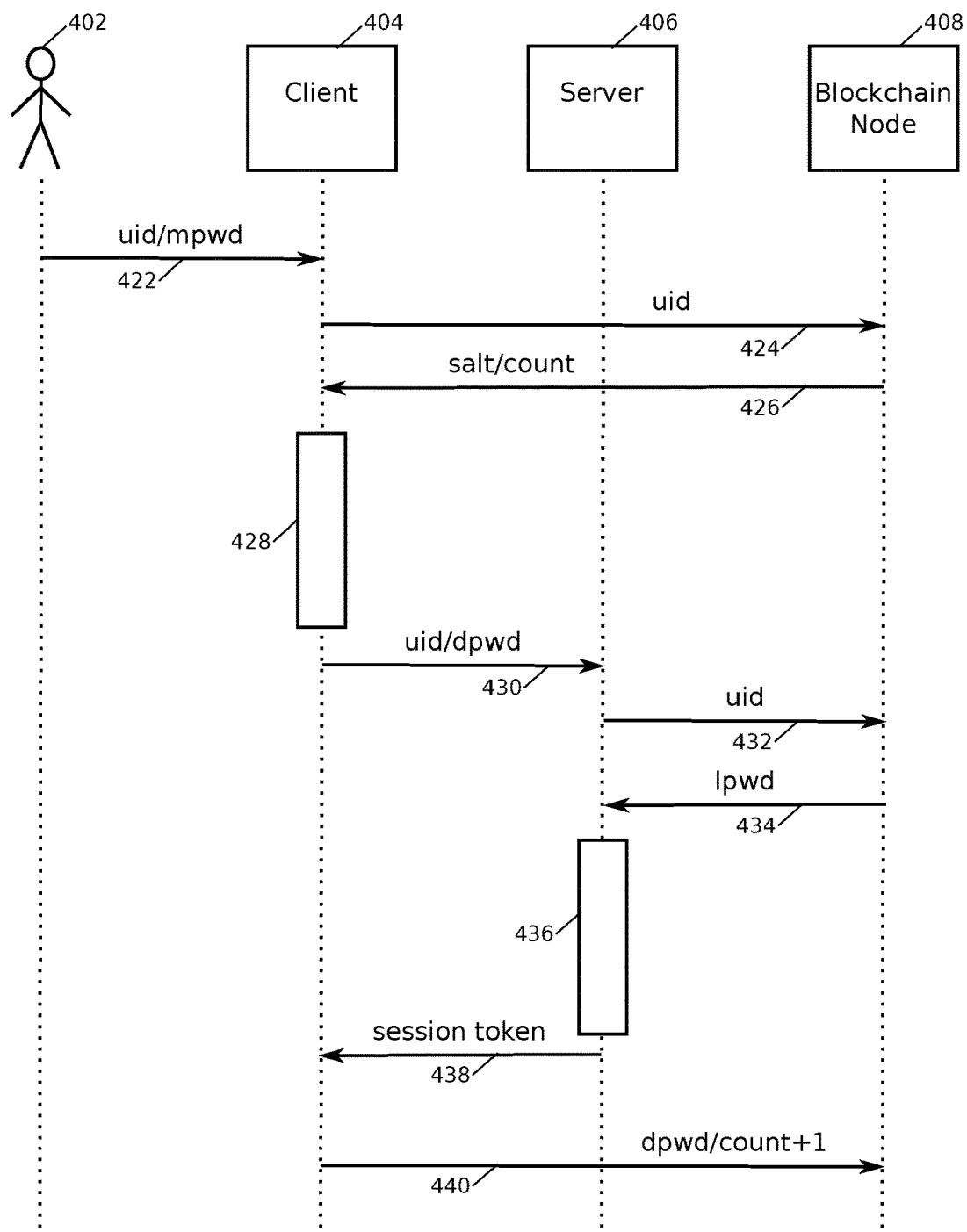
FIG. 4 is a sequence diagram illustrating an access challenge and response, in one embodiment of the present disclosure.

In FIG. 4 a sequence diagram illustrating an access challenge and response, in one embodiment of the present disclosure, is presented.

In the embodiment, operations may commence by a user 402 supplying a user identifier (uid) and a master password (mpwd) to a client 404, as shown by 422, for example by the user entering them in a login page presented in a web page. This constitutes a login attempt.

In the embodiment, the client 404 may then pass the user identifier (uid) to a blockchain node 408, as shown by 424.

In the embodiment, the blockchain node 408 may scan a blockchain to retrieve a user announcement message comprising a salt, and in some embodiments a count. The blockchain node 408 may pass the salt, and in some embodiments the count back, to the client 404, as shown by 426.

In the embodiment, the client 404 may use the salt and the master password to derive a one-time password pad, as shown by process 428. The client 404 may, in some embodiments, use the count to determine a derived password to select from the one-time password pad.

In some embodiments, the count may comprise a number of previously used passwords from the one-time password pad. In other embodiments, instead of the count a last used password may be returned by the blockchain node 408, and the client may select a prior password to the last used password from the one-time password pad as a derived password.

In the embodiment, the client 404 may then pass the user identifier (uid) and the derived password (dpwd) to the server 406, as shown by 430.

In the embodiment, the server 406 may pass the user identifier (uid) to the blockchain node 408, as shown by 432.

In the embodiment, the blockchain node 408 may scan the blockchain to retrieve a last used password (lpwd) from the blockchain. The last used password may be extracted from a message published on the blockchain during a prior login for the user identifier.

In the embodiment, the last used password (lpwd) may then be returned to the server 406, as shown by 434.

In the embodiment, as shown by process 436, the server 406 may apply a hash function to the derived password, resulting in a hash output. The server 406 may then compare the hash output with the last used password. If the hash output and the last used password are different, the server may determine that the login attempt is unsuccessful, and may return a failure message to the client 404.

In the embodiment, if the hash password and the last used password are the same, the server 406 may determine that the login attempt is successful, and may return a session token to the client 404, as shown in the embodiment by 438.

In the embodiment, the session token may then be present by the client 404 to manage identity and access to resources of the server 406 in a usual manner, as is known to those skilled in the art. For example, in some embodiments, the session token may comprise a cookie. In other embodiments the session token may comprise a JavaScript Object Notation (JSON) web token.

In some embodiments, after the login attempt is successful the client 404 may pass the derived password (dpwd) and/or an incremented count (count+1) to the blockchain node 408, for publishing on the blockchain, as is shown by node 440. Through this, a future login attempt may receive a new count and/or a new derived password.

In other embodiments, after the login attempt is successful the server 406 may pass the derived password (dpwd) to the blockchain node 408, for publishing on the blockchain.

Figure 5:
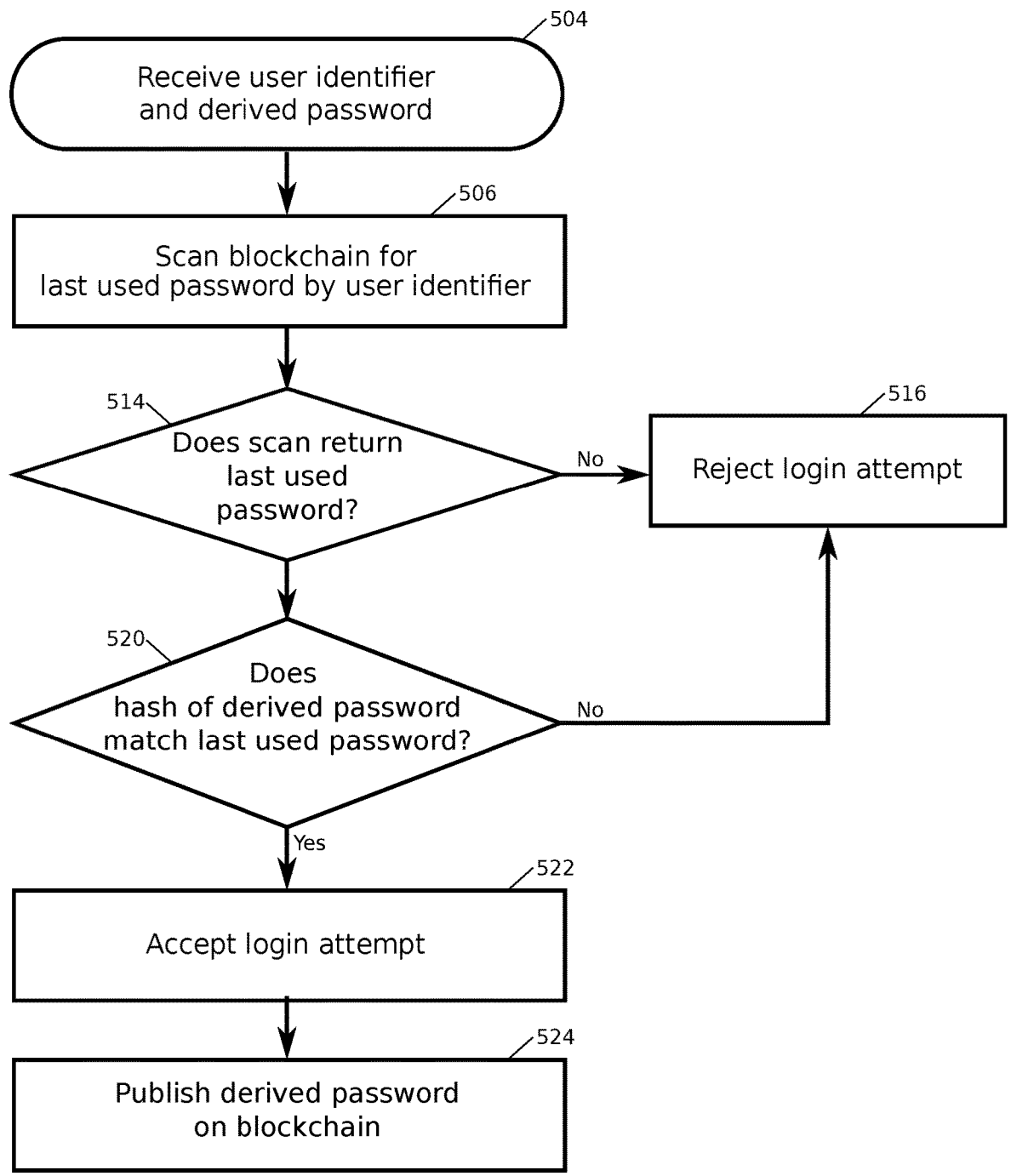
FIG. 5 is a flow diagram illustrating a process for verifying a response to an access challenge, in one embodiment of the present disclosure.

In FIG. 5 a flow diagram illustrating a process for verifying a response to an access challenge during a login attempt to a computer system is presented, in an embodiment of the present disclosure.

In the embodiment, operations may commence on receiving a user identifier and a derived password, as shown in step 504.

In the embodiment, operations may proceed with a scan of a blockchain for a message comprising a last used password and the user identifier, as shown in step 506.

In the embodiment, operations may proceed by determining whether the last used password for the user identifier was presented on the blockchain, as shown in step 514. If no last used password is found, operations may proceed to step 516, and the login attempt may be rejected.

In the embodiment, if the last used password is found, operations may proceed to step 520, in which the last used password may be compared to a hash output resulting from an application of a hash function to the derived password. If the hash output and the last used password are different, operations may proceed to step 516, and the login attempt may be rejected.

In the embodiment, if the hash output and the last used password are the same, operations may proceed to step 522, and the login attempt may be accepted.

In some embodiments, operations may then proceed to step 524, in which a message comprising the derived password labeled as a new last password may be published on the blockchain. The message may also comprise the user identifier.

In some embodiments, the message may also comprise a transaction comprising an offering of a token or digital credit of value.

Figure 6:
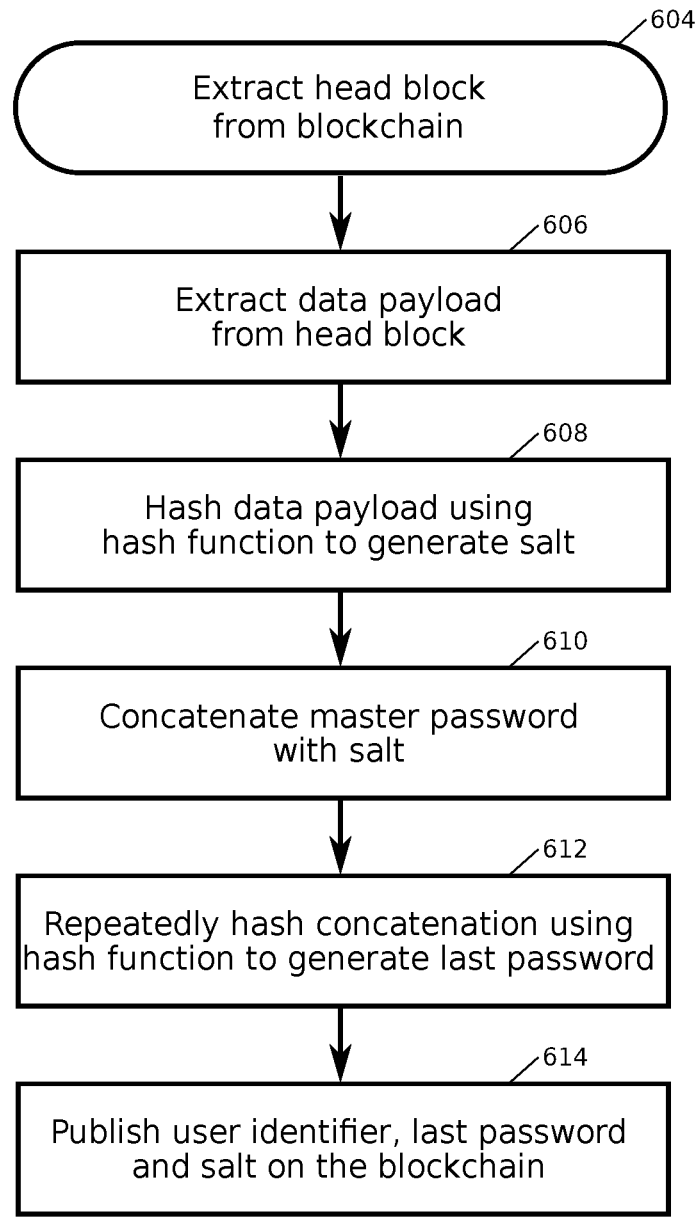
FIG. 6 is a flow diagram illustrating a process for deriving a salt from data in the blockchain, generating a one-time password pad, and publishing a last password on a blockchain, in one embodiment of the present disclosure.

In FIG. 6 a flow diagram illustrating a process for deriving a salt from data in the blockchain, generating a one-time password pad, and publishing a last password on a blockchain, in accordance with a possible embodiment of the present disclosure, is presented.

In the possible embodiment, operations may commence with an extraction of a head block from a blockchain, as shown in step 604. In some embodiments the head block may be a most recent block published on the blockchain. In other embodiments, the head block may be an earlier block, for example a block considered by participants on the blockchain to have been reliably confirmed.

In the possible embodiment, operations may proceed with an extraction of a data payload from the head block, as shown in step 606. In some embodiments, the data payload may comprise an entirety of the head block.

In the possible embodiment, operations may proceed with step 608, through an application of a hash function to the data payload, said application generating a hash output. The hash output may be referred to as a salt. In some embodiments, the data payload may be the salt. In other embodiments, the salt may be an empty string.

In the possible embodiment, operations may proceed by generating a concatenation, as shown in step 610. The concatenation may comprise a master password and the salt.

In the possible embodiment, operations may proceed by repeatedly hashing the concatenation to generate a last password, as shown in step 612. In some embodiments, a number of hashes conducted may be a predetermined number. In other embodiments, the number of hashes conducted may be determined by a predetermined time passing, during which hashing is conducted. In yet other embodiments, the number of hashes conducted may be a large number, for example a million or a hundred million.

In the possible embodiment, operations may proceed by creating a message and publishing the message on the blockchain, as shown in in step 614. In the possible embodiment, the message may comprise a user identifier, the salt and the last password. In some embodiments the user identifier may comprise at least one of: an email address, a public key of an asymmetric key pair, a unique string.

In some embodiments, the message may further comprise the number of hashes conducted.

Figure 7:
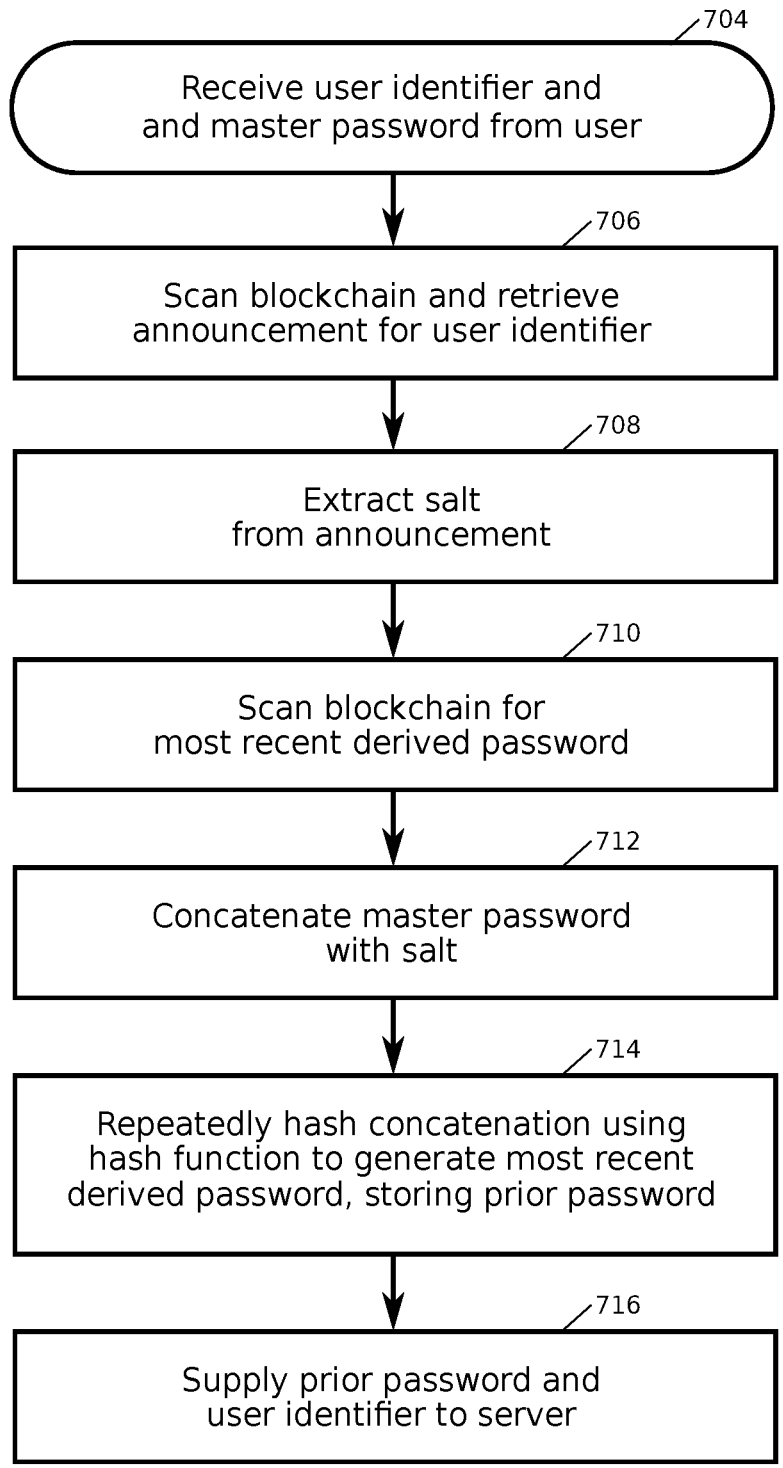
FIG. 7 is a flow diagram illustrating a process for regenerating a part of a one-time password pad using a master password and data from the blockchain to produce a new password, in one embodiment of the present disclosure.

In FIG. 7 a flow diagram illustrating a process for regenerating a part of a one-time password pad using a master password and data from the blockchain to produce a new password, in an embodiment of the present disclosure, is presented.

In the embodiment, operations may commence by receiving a user identifier and master password from a user, as shown in step 704.

In the embodiment, operations may proceed by scanning a blockchain and retrieving an announcement message for the user identifier, as shown in step 706.

In the embodiment, operations may proceed by extracting a salt from the announcement message, as shown in step 708.

In the embodiment, operations may proceed by scanning the blockchain for the most recent derived password, for the user identifier, published on the blockchain, as shown in step 710. In some embodiments, the most recent derived password may also be referred to as a last password.

In the embodiment, operations may proceed by generating a concatenation, as shown in step 712. The concatenation may comprise a master password and the salt.

In other embodiments, step 712 may be conducted after step 708 and before step 710.

In the embodiment, operations may proceed by repeatedly hashing the concatenation, as shown in step 714. Operations may comprise hashing the concatenation with a hash function, storing a hash output, comparing the hash output with the most recent derived password, and repeating the operations until the hash output is the same as the most recent derived password. A prior hash output, as stored, is then a prior password. Those skilled in the art will appreciate that applying the hash function to the prior password results in a hash output that is equal to the most recent derived password.

In other embodiments the prior password may be an earlier stored hash output, such that applying the hash function a multiple number of times results in the hash output that is equal to the most recent derived password.

In the embodiment, operations may proceed by supplying the prior password and the user identifier to a server, as shown in step 716.

In other embodiments the multiple number may also be supplied to the server.

Figure 8:
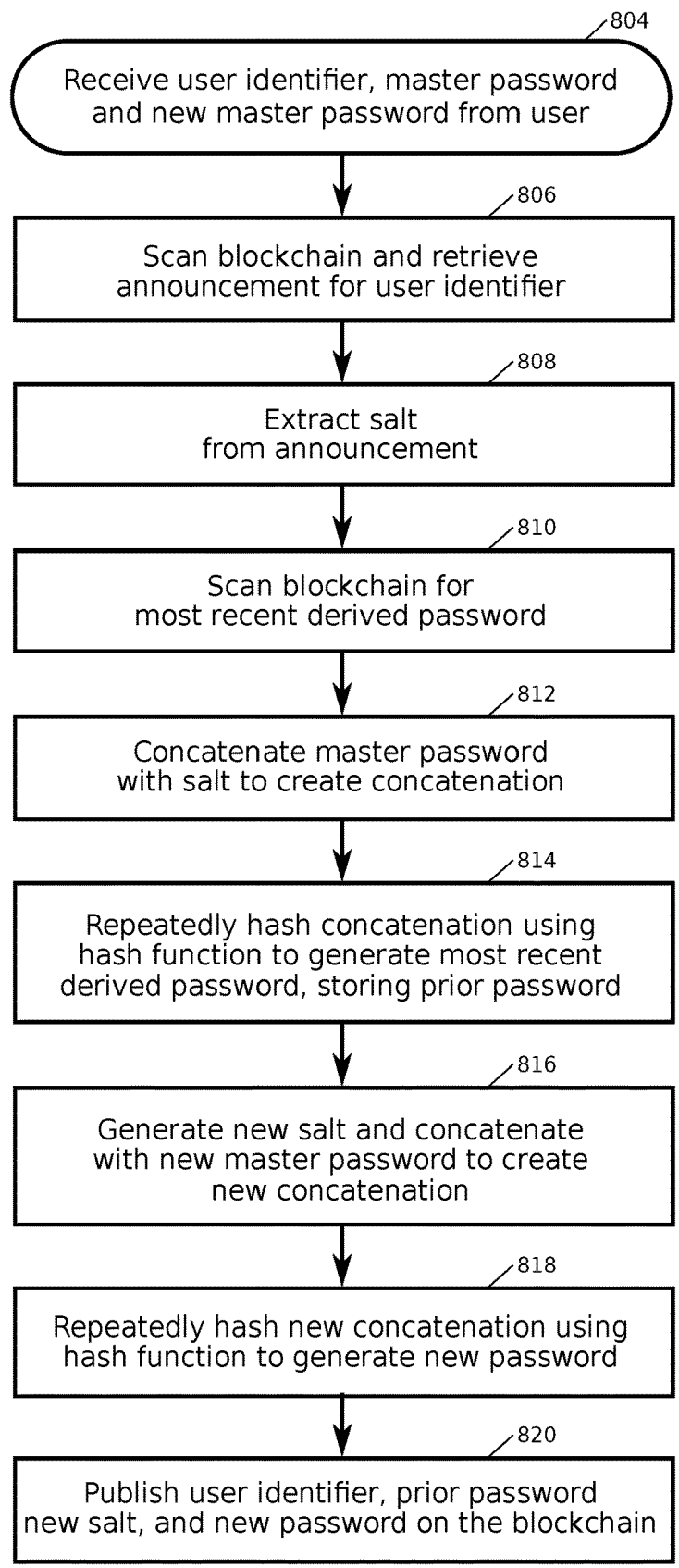
FIG. 8 is a flow diagram illustrating a process for generating a new one-time password pad linked to an existing user identifier, in one embodiment of the present disclosure.

In FIG. 8 a flow diagram illustrating a process for generating a new one-time password pad linked to an existing user identifier, in an embodiment of the present disclosure, is presented.

In some circumstances a user may require a new master password. The process of the embodiment illustrated in FIG. 8 allows a new one-time password pad to be generated from the new master password, and for a prior master password and a prior one-time password pad to be deprecated, with authority passed on from the prior one-time password pad to the new one-time password pad.

In the embodiment, operations may commence by receiving the user identifier, the prior master password and the new master password from the user, as shown in step 804.

In the embodiment, operations may proceed by scanning a blockchain and retrieving an announcement for the user identifier, as shown in step 806.

In the embodiment, operations may then proceed by extracting a salt from the announcement, as shown in step 808.

In the embodiment, operations may proceed by scanning the blockchain for the most recent derived password, for the user identifier, published on the blockchain, as shown in step 810. In some embodiments, the most recent derived password may also be referred to as a last password.

In the embodiment, operations may proceed by generating a concatenation, as shown in step 812. The concatenation may comprise the prior master password and the salt.

In other embodiments, step 812 may be conducted after step 808 and before step 810.

In the embodiment, operations may proceed by repeatedly hashing the concatenation, as shown in step 814. Operations may comprise hashing the concatenation with a hash function, storing a hash output, comparing the hash output with the most recent derived password, and repeating the operations until the hash output is the same as the most recent derived password. A prior hash output, as stored, is then a prior password. Those skilled in the art will appreciate that applying the hash function to the prior password results in a hash output that is equal to the most recent derived password.

In other embodiments the prior password may be an earlier stored hash output, such that applying the hash function a multiple number of times results in the hash output that is equal to the most recent derived password.

In the embodiment, operations may then proceed by generating a new salt and concatenating the new salt with the new master password to generate a new concatenation, as shown in step 816.

In the embodiment, operations may then proceed by repeatedly hashing the new concatenation to generate a new password, as shown in step 818. In some embodiments, a number of hashes conducted may be a predetermined number. In other embodiments, the number of hashes conducted may be determined by a passing of a set time, during which hashing is conducted. In yet other embodiments, the number of hashes conducted may be a large number, for example a million or a hundred million.

In the embodiment, operations may proceed by creating a message and publishing the message on the blockchain, as shown in in step 820. In the embodiment, the message may comprise the user identifier, the prior password, the new salt and the new password. In some embodiments the user identifier may comprise at least one of: an email address, a public key of an asymmetric key pair, a unique string.

In some embodiments, the message may further comprise the number of hashes conducted.

Figure 9:
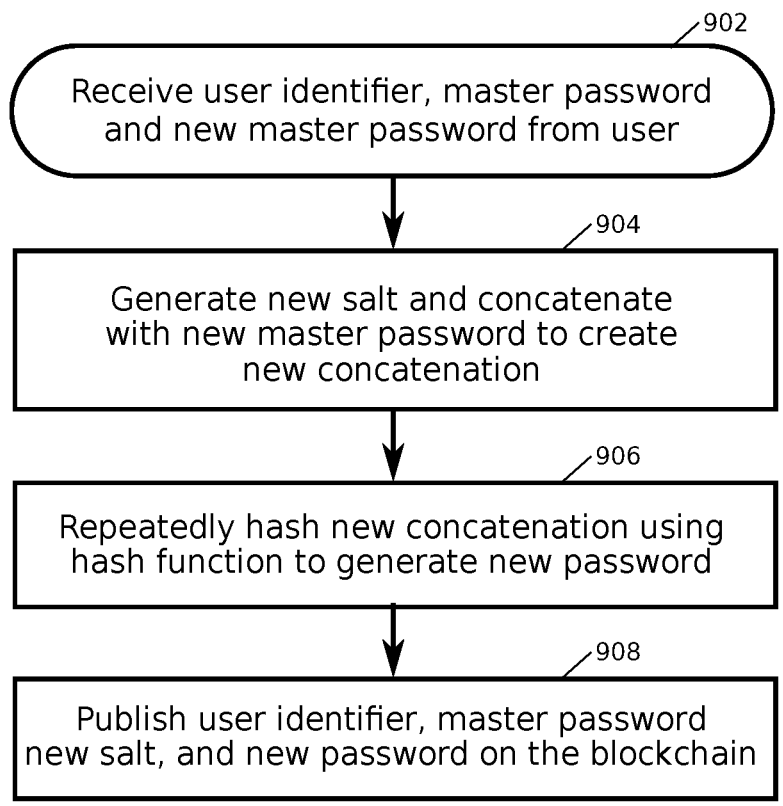
FIG. 9 is a flow diagram illustrating a process for generating a new one-time password pad linked to an existing user identifier, in an alternate embodiment of the present disclosure.

In FIG. 9 a flow diagram illustrating a process for generating a new one-time password pad linked to an existing user identifier, in an alternate embodiment of the present disclosure, is presented.

In the alternate embodiment, operations may commence by receiving a user identifier, a master password and a new master password from the user, as shown in step 902.

In the alternate embodiment, operations may then proceed by generating a new salt and concatenating the new salt with the new master password to generate a new concatenation, as shown in step 904.

In the alternate embodiment, operations may then proceed by repeatedly hashing the new concatenation to generate a new password, as shown in step 906. In some embodiments, a number of hashes conducted may be a predetermined number. In other embodiments, the number of hashes conducted may be determined by a passing of a set time, during which hashing is conducted. In yet other embodiments, the number of hashes conducted may be a large number, for example a million or a hundred million.

In the alternate embodiment, operations may proceed by creating a message and publishing the message on the blockchain, as shown in in step 908. In the alternate embodiment, the message may comprise the user identifier, the master password, the new salt and the new password. In the present disclosure, the message is also referred to as a new user identifier announcement, and the master password is also referred to as a prior identifier announcement master password.

In some embodiments the user identifier may comprise at least one of: an email address, a public key of an asymmetric key pair, and a unique string.

In some embodiments, the message may further comprise the number of hashes conducted.

In some embodiments, the message may further comprise a token transaction. The token transaction may consist of an offering of tokens or digital credits of commercial value.

In some embodiments the token transaction may comprise a smart contract. Said smart contract, when run, may return a true or false result for determining the validity of the master password and/or the new password.

In some embodiments the new one-time password pad linked to the existing user identifier may be generated using the master password and a new salt. The new salt may be published on the blockchain.

Figure 10:
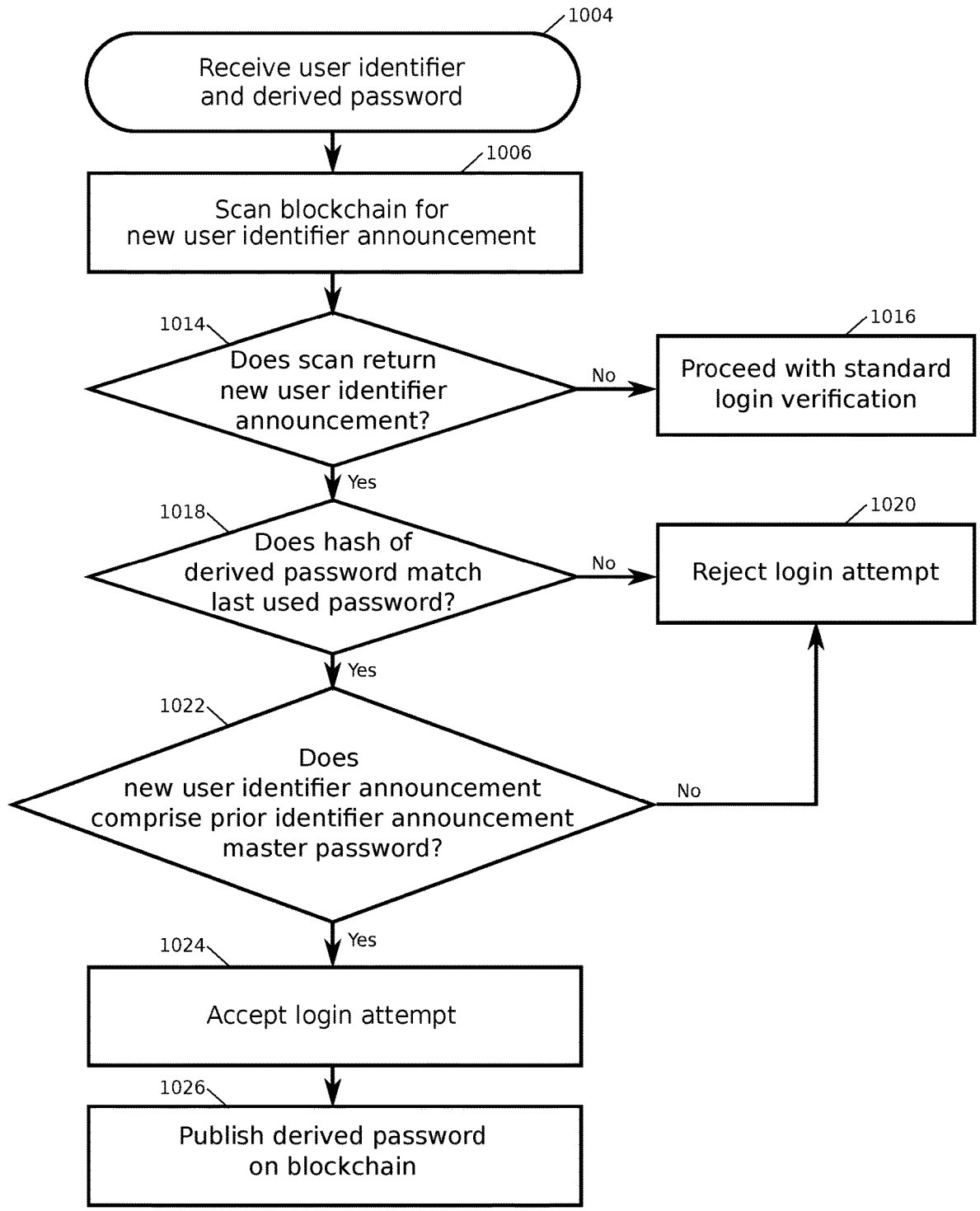
FIG. 10 is a flow diagram illustrating a process for verifying a response to an access challenge, said response comprising a prior password from a new one-time password pad, in one embodiment of the present disclosure.

In FIG. 10 a flow diagram illustrating a process for verifying a response to an access challenge, said response comprising a prior password from a new one-time password pad, in an embodiment of the present disclosure, is presented.

In the embodiment, operations may commence by receiving a user identifier and a derived password from the user, as shown in step 1004.

In the embodiment, operations may proceed by scanning a blockchain for a new user identifier announcement comprising the user identifier, as shown in step 1006.

In the embodiment, operations may then proceed by determining if the new user identifier announcement comprising the user identifier is detected on the blockchain, as shown in step 1014. If no new user identifier is detected, then, as shown in step 1016, operations may proceed using a standard login verification. A possible embodiment of the standard login verification is described in the detailed description accompanying FIG. 5.

In the embodiment, if the new user identifier is detected, operations may then proceed to step 1018 by applying a hash function to the derived password, producing a hash output, and determining if the hash output is the same as a last used password for the user identifier published on the blockchain. If the hash output and the last used password are different, operations may proceed to step 1020, and the login attempt may be rejected.

If the hash output and last user password are the same, operations may proceed to step 1022, in which the new user identifier announcement is examined. In the embodiment, if the new user identifier announcement comprises a prior identifier announcement master password, operations may proceed to step 1024. If the new user identifier announcement does not comprise the prior identifier announcement master password, operations may proceed to step 1020, and the login attempt may be rejected.

In the embodiment, in step 1024, the login attempt may be accepted.

In some embodiments of the embodiment, operations may then proceed to step 1026, in which a message comprising the derived password labeled as a new last password may be published on the blockchain. The message may also comprise the user identifier.

In some embodiments, the message may also comprise a transaction comprising an offering of a token or digital credit of value.

In FIG. 11 an exemplary embodiment of a structure of a smart contract 1100 is presented. In the exemplary embodiment the smart contract 1100 may provide blockchain functionality in a form of procedures and methods related to identity and access management and associated offerings and redemptions of payment through tokens.

In some embodiments the smart contract 1100 may comprise a procedure 1102 for publishing a user identifier on a blockchain.

In some embodiments the smart contract 1100 may comprise a procedure 1104 for retrieving a most recent published password from the blockchain. Said procedure 1104 may take a user identifier as an input parameter, scan the blockchain for the most recent published password, and return the most recent published password.

In some embodiments the smart contract 1100 may comprise a procedure 1106 for publishing a used password on the blockchain. Said procedure 1106 may take a used password as an input parameter, scan the blockchain for a former password, and may subsequently determine the former password to be derived from the used password. In some embodiments the procedure 1106 may further determine a validity of associated token transactions.

In some embodiments the smart contract 1100 may comprise a procedure 1108 for generating a new one-time password pad. The new one-time pad may be generated in an encrypted form using a public key supplied as a parameter to the procedure 1108.

In some embodiments the smart contract 1100 may comprise a procedure 1110 for generating a salt when called with appropriate parameters. The appropriate parameters may comprise at least one of: a prior block, a hash function, a user identifier, and a payment offering.

In some embodiments the smart contract 1100 may comprise a procedure 1112 for revoking a user identifier when supplied with appropriate parameters. The appropriate parameters may compromise at least one of: a request to revoke the user identifier, a user identifier, a digital signature authorizing a revocation, and a payment acceptance.

In some embodiments the smart contract 1100 may comprise a procedure 1114 generating a token payment offering transaction, and publishing it on the blockchain.

In some embodiments the smart contract 1100 may comprise a procedure 1116 generating a token payment redemption transaction, and publishing it on the blockchain.

The systems and methods disclosed above may be embodied in a system of a plurality of network connected devices communicating through the medium of a peer-to-peer network system instantiating and maintaining a blockchain.

The technology described herein is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic-link library.

The system may be used in connection with various operating systems such as Linux®, UNIX® or Microsoft Windows®.

The system may be written in any conventional programming language such as C, C++, Pascal, or Java, and run under a conventional operating system. C, C++, Pascal, Java, and FORTRAN are industry standard programming languages for which many commercial compilers can be used to create executable code. The system may also be written using interpreted languages such as Perl, Python or Ruby, or languages that may either be compiled or interpreted, such as BASIC or Lisp.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

As will be appreciated from the above discussion, an advantage of the systems and methods of this disclosure includes managing identity and access to computer systems and resources, without recourse to a central authority or centralized directory, through the medium of a blockchain.

What is claimed is:

1. A method for providing identity and access management, comprising:
   generating a one-time password pad derived from a master password and a salt, said one-time password pad comprising a plurality of passwords, wherein each one of the plurality of passwords is generated by applying a cryptographic hash function a different number of times to a concatenation of the master password and the salt;
   publishing a last password from the one-time password pad and a user identifier on a blockchain;
   on receiving an access challenge, presenting a prior password from the one-time password pad; and
   publishing a message comprising the prior password on the blockchain.

2. The method of claim 1, wherein the access challenge comprises an offering of a payment token and the message comprises a claim of the payment token.

3. The method of claim 2, wherein the payment token is transferred using a smart contract on the blockchain.

4. The method of claim 1, wherein the prior password is published on the blockchain at a time prior to the access challenge, further comprising rejecting the prior password in response to the access challenge.

5. The method of claim 1, wherein the salt is derived from prior data in the blockchain.

6. The method of claim 1, further comprising:
   generating a new one-time password pad using a new master password and a new salt, said new one-time password pad comprising a new plurality of passwords; and
   publishing the master password, a new last password from the new one-time password pad, and the user identifier on the blockchain.

7. The method of claim 6, further comprising subsequently rejecting any one of the plurality of passwords presented in response to a new access challenge.

8. A first apparatus and a second apparatus providing identity and access management, wherein the first apparatus comprises a first hardware processor configured to issue an access challenge to the second apparatus, and the second apparatus comprises a second hardware processor configured to:
   generate a one-time password pad derived from a master password and a salt, said one-time password pad comprising a plurality of passwords, wherein the second hardware processor is further configured to generate each one of the plurality of passwords by applying a cryptographic hash function a different number of times to a concatenation of the master password and the salt;
   publish a last password from the one-time password pad and a user identifier on a blockchain;
   on receiving the access challenge, present a prior password from the one-time password pad to the first apparatus; and
   publish a message comprising the prior password on the blockchain.

9. The first apparatus and second apparatus of claim 8, wherein the access challenge comprises an offering of a payment token and the message comprises a claim of the payment token.

10. The first apparatus and second apparatus of claim 9, wherein the payment token is transferred using a smart contract on the blockchain.

11. The first apparatus and second apparatus of claim 8, wherein the prior password is published on the blockchain at a time prior to the access challenge, and wherein the first hardware processor is further configured to:
  detect a presence of the prior password on the blockchain; and
  reject the prior password in response to the access challenge.

12. The first apparatus and second apparatus of claim 8, wherein the second hardware processor is further configured to derive the salt from prior data in the blockchain.

13. The first apparatus and second apparatus of claim 8, wherein the second hardware processor is further configured to:
  generate a new one-time password pad using a new master password and a new salt, said new one-time password pad comprising a new plurality of passwords; and
  publish the master password, a new last password from the new one-time password pad, and the user identifier, on the blockchain.

14. The first apparatus and second apparatus of claim 13, wherein the first hardware processor is further configured to subsequently reject any one of the plurality of passwords in response to a new access challenge.

15. A first non-transitory computer readable medium embodying first instructions and a second non-transitory computer readable medium embodying second instructions, for providing identity and access management, the first instructions when executed causing a first processor to issue an access challenge to a second processor, and the second instructions when executed causing a second processor to:
  generate a one-time password pad derived from a master password and a salt, said one-time password pad comprising a plurality of passwords, wherein the second instructions further cause the second processor to generate each one of the plurality of passwords by applying a cryptographic hash function a different number of times to a concatenation of the master password and the salt;
  publish a last password from the one-time password pad and a user identifier on a blockchain;
  on receiving the access challenge, present a prior password from the one-time password pad; and
  publish a message comprising the prior password on the blockchain.

16. The first non-transitory computer readable medium and the second non-transitory computer readable medium of claim 15, wherein the access challenge further comprises an offering of a payment token and the message further comprises a claim of the payment token.

17. The first non-transitory computer readable medium and the second non-transitory computer readable medium of claim 16, wherein the payment token is transferred using a smart contract on the blockchain.

18. The first non-transitory computer readable medium and the second non-transitory computer readable medium of claim 15, wherein the prior password is published on the blockchain at a time prior to the access challenge, and wherein the first instructions further cause the first processor to:
  detect a presence of the prior password on the blockchain; and
  reject the prior password in response to the access challenge.

19. The first non-transitory computer readable medium and the second non-transitory computer readable medium of claim 15, wherein the second instructions further cause the second processor to derive the salt from prior data in the blockchain.

20. The first non-transitory computer readable medium and second non-transitory computer readable medium of claim 15, wherein the second instructions further cause the second processor to:
  generate a new one-time password pad using a new master password and a new salt, said new one-time password pad comprising a new plurality of passwords; and
  publish the master password, a new last password from the new one-time password pad, and the user identifier, on the blockchain.

21. The first non-transitory computer readable medium and the second non-transitory computer readable medium of claim 20, wherein the first instructions further cause the first processor to subsequently reject any one of the plurality of passwords in response to a new access challenge.

* * * * *